United States Patent Office.

HEINRICH LAUBMANN, OF HÖCHST-ON-THE-MAIN, GERMANY, ASSIGNOR TO THE FARBWERKE, VORMALS MEISTER, LUCIUS & BRÜNING, OF SAME PLACE.

BLUE DYE AND METHOD OF MAKING SAME.

SPECIFICATION forming part of Letters Patent No. 569,418, dated October 13, 1896.

Application filed December 26, 1893. Serial No. 494,750. (Specimens.)

*To all whom it may concern:*

Be it known that I, HEINRICH LAUBMANN, doctor of philosophy, a citizen of the Empire of Germany, residing at Höchst-on-the-Main, in the Empire of Germany, have invented certain new and useful Improvements in the Production of Blue Coloring-Matter, of which the following is a specification.

The dinitroanthrachrysone-disulfonic acid to be obtained by nitrating the anthrachrysone-disulfonic acid and characterized thereby that it forms an acid sodium salt crystallizing in beautiful gold-yellow leaflets of the composition $C_{14}H_4O_6(NO_2)_2(SO_3Na)_2HO$ can be converted into a valuable blue coloring-matter dyeing on mordants by reduction and subsequent boiling with alkali.

The production of the coloring-matter proceeds quite easily when an acid solution of the dinitroanthrachrysone-disulfonic acid is mixed with a suitable quantity of the reduction agent, such as, for example, tin chlorid, zinc, iron, &c. In accordance with the progress of the reaction the solution assumes intense red color and the coloring-matter separates in crystalline form. The formation of the coloring-matter is accelerated and completed by heating. The product of the reaction thus obtained is submitted to continued boiling, together with diluted carbonates of alkalies or fixed alkalies or alkaline earths, and after having been acidulated may be precipitated by means of common salt.

The coloring-matter thus produced presents itself in the form of a red crystalline powder dissolving in hot water with beautiful red, in diluted alkalies with blue color. Further addition of alkali precipitates the difficultly-soluble alkali salt in the form of blue flocks. The solution of the coloring-matter in concentrated sulfuric acid is colored bluish red. The free sulfonic acid dissolves sparingly with red color in hot alcohol or aceton. In the other usual organic solvents, such as benzene, glacial acetic acid, &c., it is, so to say, insoluble.

The coloring-matter dyes as well on mordants as in acid bath. In acid bath it dyes wool a beautiful red, on alumina mordants violet-blue, and on chrome mordants pure blue shades. The tints produced in acid bath may subsequently be shaded at will by means of metallic mordants. The shades developed by mordants are completely fast in fulling and to light.

What I claim as my invention is—

1. The process of producing blue coloring-matter, which consists in treating an acid solution of dinitroanthrachrysone-disulfonic acid with reducing agencies, such as iron, zinc &c., and subsequently boiling the same with alkalies, substantially as described.

2. As a new article of manufacture, a blue coloring-matter derived from anthrachrysone, being a red crystalline powder, dissolving in hot water with a beautiful red, in diluted alkalies with blue, in concentrated sulfuric acid with bluish-red color, very sparingly soluble in hot alcohol or aceton, insoluble in the other usual organic solvents, and further characterized that in an acid bath it is completely taken up by wool and that the fibers dyed in this manner assume shades ranging from blue to violet on being treated with metallic mordants, substantially as described.

In testimony that I claim the foregoing as my invention I have signed my name in presence of two subscribing witnesses.

HEINRICH LAUBMANN.

Witnesses:
JOSEF REVERDY,
HEINRICH HAHN.